(12) United States Patent
Gordon

(10) Patent No.: US 9,339,972 B2
(45) Date of Patent: May 17, 2016

(54) INCREASED INTER-LAYER BONDING IN 3D PRINTING

(71) Applicant: Titan Systems, LLC, Alexandria, VA (US)

(72) Inventor: Mark Gordon, Vienna, VA (US)

(73) Assignee: Titan Systems, LLC, Alexandria, VA (US)

(*) Notice: Subject to any disclaimer, the term of this patent is extended or adjusted under 35 U.S.C. 154(b) by 0 days.

(21) Appl. No.: 14/622,473

(22) Filed: Feb. 13, 2015

(65) Prior Publication Data

US 2015/0314528 A1 Nov. 5, 2015

Related U.S. Application Data

(63) Continuation of application No. 14/599,206, filed on Jan. 16, 2015.

(60) Provisional application No. 61/986,912, filed on May 1, 2014.

(51) Int. Cl.
*B29C 35/08* (2006.01)
*B29C 41/02* (2006.01)
(Continued)

(52) U.S. Cl.
CPC ......... *B29C 67/0085* (2013.01); *B29C 67/0055* (2013.01); *B29C 67/0059* (2013.01); *B29C 67/0088* (2013.01); *B29L 2009/00* (2013.01); *B33Y 10/00* (2014.12); *B33Y 30/00* (2014.12)

(58) Field of Classification Search
CPC ............ B29C 67/0051; B29C 67/0055; B29C 67/0059; B29C 67/0085; B29C 67/0092; B29C 67/0096
USPC ...................... 425/135, 143, 174.4, 375, 404
See application file for complete search history.

(56) References Cited

U.S. PATENT DOCUMENTS

| 5,393,482 A | 2/1995 | Benda et al. | |
|---|---|---|---|
| 2002/0020945 A1* | 2/2002 | Cho et al. ...................... | 264/460 |

(Continued)

FOREIGN PATENT DOCUMENTS

| EP | 2224038 A1 | 9/2010 |
|---|---|---|
| GB | 2453945 A | 4/2009 |

OTHER PUBLICATIONS

International Search Report and Written Opinion received for PCT Patent Application No. PCT/US2015/027080, mailed on Jul. 28, 2015, 11 pages.

*Primary Examiner* — Leo B Tentoni
(74) *Attorney, Agent, or Firm* — Fiala & Weaver P.L.L.C.

(57) ABSTRACT

Inter-layer bonding in objects manufactured by 3D printing techniques is improved by one or more targeted heat sources (THSs) that preheat a targeted portion of existing object material before additional material is added to the object. 3D Printing is also improved, optimized or calibrated by pre- or post-heating a targeted area. THS elements may be fixed, mobile, or a combination thereof to apply heat to targeted areas. A THS may be integrated in or as an add-on to an existing 3D printer. A THS controller may use 3D printer information, such as a current direction or a future direction of printing, to select one or more THSs and to perform other targeted heat operations, such as setting energy levels, aiming, moving, etc. Properties, e.g., strength, of 3D printed objects with improved interlayer bonding may, for example, be several multiples better than the same object printed without improved interlayer bonding.

20 Claims, 4 Drawing Sheets

(51) Int. Cl.
  *B29C 67/00* (2006.01)
  *B33Y 10/00* (2015.01)
  *B33Y 30/00* (2015.01)
  *B29L 9/00* (2006.01)

(56) References Cited

U.S. PATENT DOCUMENTS

| | | | |
|---|---|---|---|
| 2004/0003738 A1* | 1/2004 | Imiolek et al. | 101/480 |
| 2004/0173945 A1* | 9/2004 | Khoshnevis | 264/497 |
| 2004/0224173 A1* | 11/2004 | Boyd et al. | 428/500 |
| 2005/0208168 A1* | 9/2005 | Hickerson et al. | 425/174.4 |
| 2006/0054039 A1* | 3/2006 | Kritchman et al. | 101/424.1 |
| 2006/0054079 A1 | 3/2006 | Withey et al. | |
| 2007/0241482 A1* | 10/2007 | Giller et al. | 264/494 |
| 2012/0162314 A1 | 6/2012 | Swanson et al. | |
| 2013/0242317 A1* | 9/2013 | Leavitt et al. | 358/1.8 |
| 2014/0263534 A1* | 9/2014 | Post et al. | 226/196.1 |
| 2015/0174824 A1 | 6/2015 | Gifford et al. | |

* cited by examiner

INCREASED INTER-LAYER BONDING IN 3D PRINTING

CROSS-REFERENCE TO RELATED APPLICATIONS

This application is a continuation of U.S. patent application Ser. No. 14/599,206, filed Jan. 16, 2015, and titled "Increased Inter-Layer Bonding in 3D Printing," which claims the benefit of U.S. Provisional Patent Application No. 61/986,912, filed May 1, 2014, and titled "Fused Deposition Solid Free Form Printer," both of which are incorporated by reference herein in their entireties.

BACKGROUND

Three dimensional (3D) printing technologies construct or manufacture objects by printing layers of material. Categories of 3D printing techniques, which vary in the techniques used to create layers, include depositing extruded material, melting or sintering granular material, melting powder material, laminating layered material and polymerizing light sensitive material. Fused Filament Fabrication (FFF) is an example of a 3D printing technique that deposits layers of extruded material. Objects printed by 3D printing technologies tend to have less desirable properties than objects created by other object manufacturing techniques, such as injection molding, forging and milling. Generally, printed objects have weaker bonds between adjoining extrusions.

BRIEF DESCRIPTION OF THE DRAWINGS/FIGURES

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies. However, embodiments are not limited to the specific implementations disclosed herein.

Figure 1:
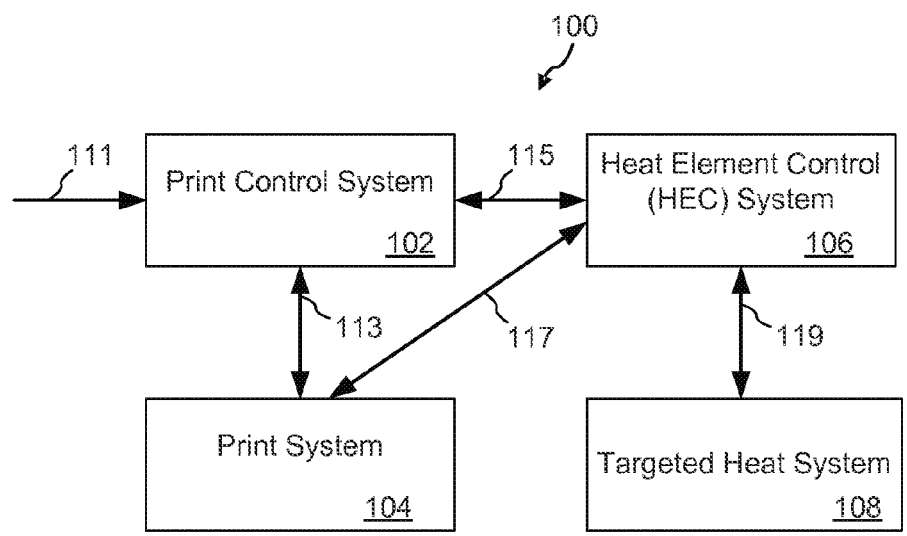
FIG. 1 shows a block diagram of an exemplary system in which embodiments of improved inter-layer bonding in 3D printing may be implemented.

Exemplary embodiments will now be described with reference to the accompanying figures.

DETAILED DESCRIPTION

Methods, systems, and apparatuses will now be described for improving inter-layer bonding in 3D printing. Inter-layer bonding in objects manufactured by 3D printing techniques may be improved by one or more THSs (targeted heat sources) that pre-heat a targeted portion of existing object material before additional material is deposited. Properties of 3D printed objects may be improved, optimized or calibrated by pre- or post-heating a targeted area of material. One or more THSs may be attached to, integrated in, or independent of a printer in a respective 3D printing technology. THSs may be fixed, mobile, or a combination thereof to apply heat to targeted areas. For example, four fixed and equally spaced elements and 90 degree rotation provide full pre-heating coverage for a printing process. Targeted heat parameters (e.g., direction, aim, intensity, diameter or pattern of preheating) may be controlled. A THS may be integrated in or as an add-on to an existing 3D printer. A THS controller may use 3D printer information, such as a current direction or a future direction of printing, to select one or more THSs and to perform other targeted heat operations, such as setting energy levels, aiming or moving. Properties, e.g., strength, of 3D printed objects with improved interlayer bonding may, for example, be several multiples better than the same object printed without improved interlayer bonding.

A device, apparatus, article of manufacture, system, component in a system, etc. may comprise, for example, a 3D printer, a component in a 3D printer, a print head, a THS, a targeted heat element, a THS controller, a program storage device storing executable instructions that may be used to implement a method or process for THSs, or any combination thereof.

A THS may provide calibrated interlayer bonding by heating existing and additional layered material to improve, interlayer bonding. As previously mentioned, a 3D printer, using a variety of techniques, deposits additional material that bonds with or adheres to existing material.

Interlayer bonding may be calibrated, optimized or improved, for example, by making targeted heating decisions based on one or more parameters, states or conditions. Heating decisions may be static (fixed) or dynamic (variable) during 3D printing. Heating decisions may vary based on feedback about one or more parameters, states, or conditions. For example, a THS controller may monitor and/or use one or more parameters, states, or conditions of a 3D printer, such as, a current direction of deposition, a future direction of deposition, a rate of deposition, print head parameter(s) such as temperature, velocity, and acceleration, environment ambient temperature, bed temperature, etc. A THS controller may monitor and/or use one or more parameters, states, or conditions of material, such as a material type, color, temperature, elapsed time since deposit, and depth of material. A THS controller may monitor and/or use one or more parameters, states or conditions of a THS, such as distance to material, number of elements, fixed or variable aim, focus, intensity, magnitude, frequency, modulation and position.

THS component(s) may be attached to or in a print head, independent of a print head, or a combination thereof. A THS, or one or more components thereof, may be manufactured with or as an add-on to a 3D printer. A THS may comprise multiple components, such as a laser diode coupled to one or more optical fibers.

A THS may move, wholly or partially, with a print head (e.g., wholly or partially dependent on print head movement). A THS may move, wholly or partially, independent of a print head. A THS, e.g., its one or more elements, may be wholly or partially fixed. Aim, focus, intensity, frequency, modulation, position and/or other parameters of heater elements may be fixed and/or variable.

A method or process may be used to implement a THS that provides pre- and/or post-heating of material that increases, calibrates, optimizes or improves interlayer bonding. A process may monitor, store, update, use, and/or control one or more states, conditions or parameters, such as for a 3D printer, material, and/or THS. A process may use one or more states, conditions, or parameters to activate one or more THS element(s) to provide targeted heat. A process may use one or more states, conditions, or parameters to control one or more operating parameters of one or more THS components, e.g., heat source or heat element intensity, aim, position, movement, etc. to provide selected pre- and/or post-heat.

FIG. 1 depicts an exemplary fused filament fabrication (FFF) 3D printing system 100. 3D printing system 100 includes a print control system 102, a print system 104, a heat element control (HEC) system 106, and a targeted heat system 108. These components of 3d printing system 100 are described as follows.

An embodiment of print control system 102 includes electronics, sensors and other components that control the creation of the 3D objects that are present in print system 104. Print control system 102 may include temperature sensing and control for a deposition head and ambient temperature and other sensors and controllers present in print system 104. Print control system 102 typically responds to configuration information, either manually or automatically configured or sensed, and digital model information, such as available from a Stereo Lithography File or a set of g-code commands, to create the 3D object. Print system 104 includes the mechanical and electrical systems necessary to implement a 3D printing process used in the 3D printing system 100. An embodiment of print system 104 may comprise a three or more axis carriage, actuators, power supplies, ambient cooling and heating elements such as fans, material feed sensing and material feed motors and gears, heated bed sensors, deposition head solenoids for positioning deposition heads, and ambient temperature sensors and control. Material may be sensed, for example, based on electronics (e.g., a memory chip) embedded in a material supply cartridge. Temperature sensor input may include temperature information for deposition heads, target bed, ambient environment, and for other parts of 3D printing system 100. Positioning information may be fed back to or maintained by print control system 102 to determine the position of one or more deposition heads. Other inputs may include, for example, information from sensors on auto leveling beds and homing switches for axial movement.

Figure 2:
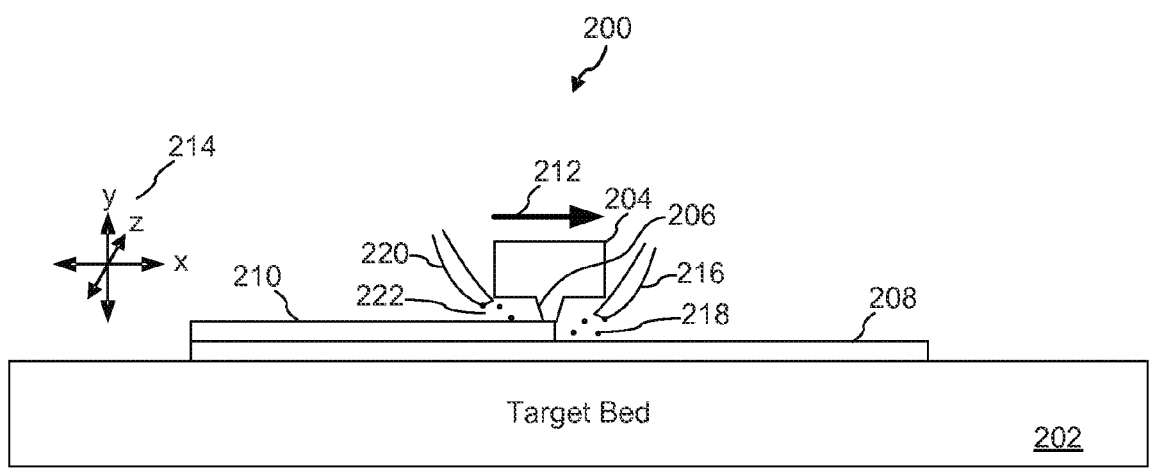
FIG. 2 shows a diagram of a system configured to enable improved inter-layer bonding in 3D printing, according to an exemplary embodiment.

FIG. 2 shows a diagram of a system 200 that enables improved inter-element bonding in 3D printing, according to embodiments. In an embodiment, system 200 utilizes FFF. In alternative embodiments, other techniques for 3D printing including, but not limited to, Selective Laser Sintering, Direct Metal Deposition or other known methods for creating 3D printed objects using heat fusion, may also be used. System 200 includes a target bed 202, a deposition or print head 204, a deposition or print nozzle 206, a first targeted heat source (THS) 216, and a second THS 220. Components of the print system, including the print control system, such as material feeder, actuators, mounts, sensors, heaters and electronics, used to operate print head 204 are omitted from FIG. 2 for ease of illustration.

A dimensional key 214 is shown in FIG. 2 to illustrate three dimensions or axes X, Y and Z. In various implementations, target bed 202, print nozzle 202, print head 204, first THS 216 and/or second THS 220 may variously be fixed or move in one or more of these axes and/or may rotate to implement multi-dimensional printing.

Target bed 202 supports an object being printed. Target bed 202 may be fixed or mobile in one or more axes. A movable carriage or other conveyance technique may be used to move target bed 202 in one or more dimensions. Target bed 202 may be wholly or partially heated.

Print head 204 is configured to print a material through print nozzle 206. A movable carriage or other conveyance technique may be used to move print head 204 in one or more dimensions. For example, print head 204 may be attached to an X axis slide. A gear or belt may move print head 204 along linear slides, positioning it in that axis. Target bed 202 may move up and down in the Z axis, allowing material to be deposited in layers on it, and/or deposition head 204 may move up and down. Another set of slides, motors and belts or gears may move the X axis assembly in the Y direction or along other axes, such as rotational axes.

Print head 204 may be fabricated from any suitable material. Print head 204 may be heated to a temperature suitable for the material being printed. In some embodiments, system 200 may have multiple print heads.

Print nozzle 206 is coupled to a print head 204. In some embodiments a single print head 204 may have multiple print nozzles 206. Print nozzle 206 emits or deposits material fed through print head 204. Print nozzle 206 may be any suitable material, e.g., brass. Print nozzle 206 may have one or more orifices to emit material. Orifice size and/or shape may be fixed or variable to deposit material with fixed or variable material thicknesses, patterns, etc.

FFF printer 200 is shown with first and second (THSs) 216, 220. Various embodiments may have one or more THSs. First and second THSs 216, 220 may be activated to heat 218, 222 portions of deposited material. A THS, such as first and second THS 216, 220, may comprise any targetable or precision heat source such as a fine stream of hot air, a heated tip of a filament, an electron beam, a laser and a fiber coupled laser diode. The type of THS may depend on the underlying print technology and material. The THS may be targetable or may need to incorporate guides or other elements to accurately target them. In an example, a heated metal filament may retain its directional heat properties without other supporting material. In another example, a fiber optic cable may need a structural support or guide to be accurately targeted.

First and second THSs 216, 220 may be mounted to print head 204, to an assembly containing the print head 204, to nozzle 206, or to any other component of FFF printer 200. First and second THSs 216, 220 may be mounted independently of components of FFF printer 200. First and second THSs 216, 220 may be fixed or mobile. In embodiments, one or more THSs may be focused, aimed, or positioned statically or dynamically on a target area. Parameters for the target area may depend on the technology being used as well as the material or other parameters. Multiple sets of first and second THSs 216, 220 may be present if multiple print heads 204 or print nozzles 206 are present.

In embodiments, one or more THSs 216, 220 may pre-heat a portion of existing material 208 in the target area before additional material is deposited and/or may post-heat additional material in the target area after the material is deposited to improve interlayer bonding. Either or both pre-heating and post-heating may be used to improve properties of printed objects, such as to improve interlayer bonding. In some embodiments and technologies, disparate or continuous target areas may be concurrently deposited and/or heated, which may result in concurrently pre- and/or post-heating the disparate or continuous areas targeted for printing or recently printed. The primary difference between pre-heating and post-heating is that pre-heating is done immediately before deposition of additional material 210, with the goal of adding as little energy as possible to raise the temperature of the existing material 208 to a desired level before the deposition of the additional material 210. In an example embodiment, post-heating takes place after deposition of additional material with the goal of adding as little energy as possible to maintain a desired temperature in the just deposited additional material 210 for as long as possible without introducing undesirable levels of waste energy.

In an embodiment, pre-heating would include heating existing material 208 to a temperature that would improve bonding with additional material 210. The pre-heating is configured to ensure that the appropriate temperature is maintained in the targeted existing material 208 until additional material 210 is deposited. In an embodiment with an FFF printer printing ABS (acrylonitrile butadiene styrene) material the threshold temperature for bonding is the sintering temperature and may be above 210 degrees Celsius.

Within a very short period after heat is removed the energy dissipates from the heated area into the ambient environment or existing material 208. In an embodiment with FFF printing it is typically desirable to minimize the quantity of dissipated energy to maintain dimensional accuracy, among other reasons. Therefore, in an example FFF embodiment THSs 216, 220 apply only the energy necessary to raise the temperature to the desired value, as late as possible before additional material 210 is deposited and only in the area where it will help increase bond strength with the additional material 210. In this manner the waste energy created is minimized while the bond strength of additional material 210 with existing material 208 is maximized. In an example FFF embodiment, post-heating has the same limitations as pre-heating regarding waste energy and dimensional accuracy and other properties. Maintaining the temperature above a certain value after deposition may improve bonding of the additional material 210 after deposition. In an embodiment, THS 220 can be used to maintain, increase or slow the decrease of the temperature of the additional material 210.

Another effect of the fast drop in temperature of existing material 208 is that the bonding of additional material 210 to existing material 208 quickly stops. Post-heating directly after additional material 210 is deposited may increase the time during which bonding occurs, increasing bond strength. Post-heating is limited to directly after the additional material is deposited to minimize the generation of water energy, as in pre-heating. First and second THSs 216, 220 may be on, off and at any level there between, which may include modulation of the energy output to achieve a desired total energy output. Each of first and second THSs 216, 220 may operate to provide pre-heating, post-heating or both, either serially or in parallel (substantially concurrently or simultaneously), intermittently or continuously.

Control of first and second THSs 216, 220 (not shown) may be based on parameters, conditions or states in order to calibrate, improve or optimize one or more characteristics of a printed model, e.g., interlayer bonding. Parameters, conditions or states and algorithm(s) based thereon may calculate or otherwise determine energy levels, aim, focus, positioning, etc. to avoid overheating targeted areas, heating non-targeted areas while optimizing adherence or bonding between new and existing deposited material. Information, such as ambient temperature, pressure, material type and color, deposition temperature of the material and duration since the material was deposited may allow precise application of energy to raise the material to the appropriate temperature without causing excessive deformation of surrounding material. Energy applied may be modified by, for example, by modulating the power of one or more heat sources.

FIG. 2 illustrates a 3D print in progress. As shown in FIG. 2, previously existing material 208 has been deposited. Additional material 210 is subsequently deposited adjacent to previously existing material 208. Material, e.g., existing material 208 and additional material 210, may be homogeneous or heterogeneous. The material used may depend on the particular 3D printing technology, e.g., depositing extruded material, melting or sintering granular material, melting powder material, laminating layered material and polymerizing light sensitive material. Among the various technologies, material may be, for example, thermoplastic (e.g., PLA, ABS), plastic film, HDPE, metal, metal powder, metal foil, ceramic powder, rubber, clay, plaster, paper, silicone, porcelain, or photopolymer.

In the example of FIG. 2, print head 204 is shown depositing material in the X-axis 212. A direction of deposition may be created by moving one or both target bed 202 and print head 204. In some embodiments, one or both target bed 202 and print head 204 may move in one or more directions and/or rotate. FFF printer 200 may dispense a continuous feed of the target material, e.g., ABS.

As shown, with print head 204 depositing additional (new) material 210 over existing (already printed) material 208 in the X direction, first THS 216 is pre-heating an area of existing material 208 targeted for printing by print head 204 and second THS 220 is postheating additional material 210 recently printed by print head 204. In various embodiments, preheating, posting or both may occur, including concurrently. An area targeted for printing may also be referred to as an area of next printing/deposition.

Although new and existing layers are presented as an over/under adjacent relationship, new and existing material may have other relationships, e.g., side to side adherence or bonding, side-to-side and over-under, angle to angle, etc. In some embodiments, pre and/or post heating may pre and/or post heat multiple surfaces of one or more layers of material, e.g., a side and top surface of a deposit or a top, bottom or side of a deposit and a top, bottom or side of another deposit. Surfaces subjected to printing, pre and post heating may be a matter of orientation and model construction methodology.

Figure 3A:
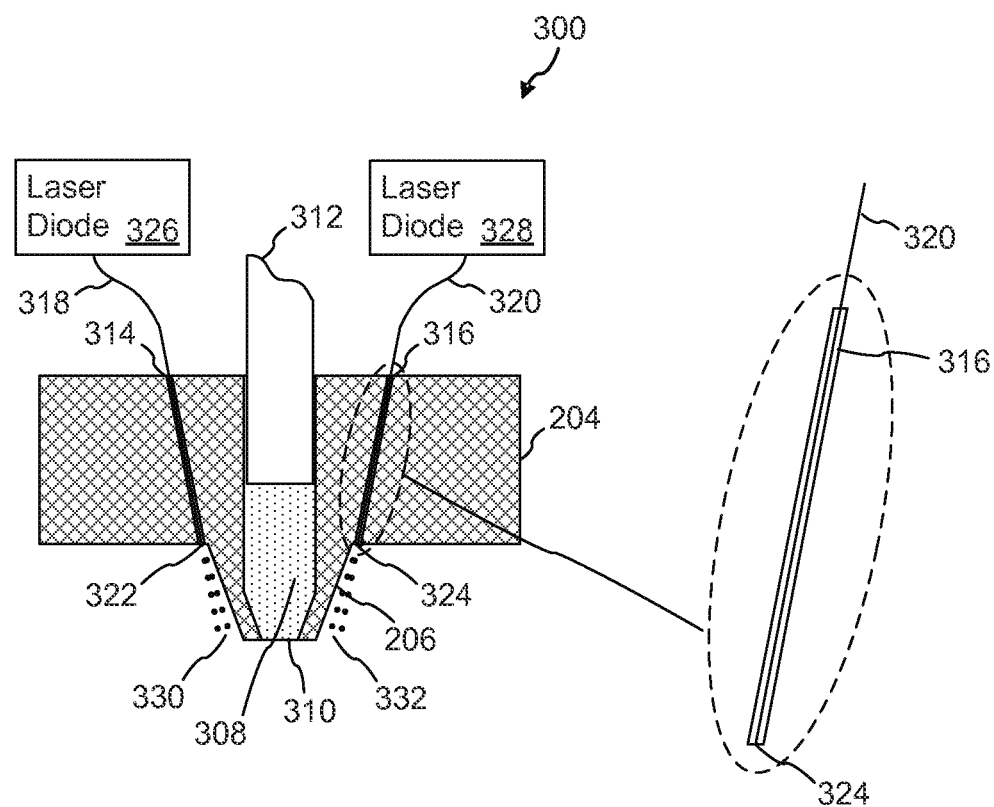
FIG. 3A shows a cross-sectional view of a print system with targeted heating elements, according to an exemplary embodiment.

FIG. 3A shows a cross-sectional side view of a portion 300 of print system 200 in accordance with embodiments. Portion 300 includes print head 204, print nozzle 206, first and second THS guides (THS conveyances or elements) 318, 320 and first and second THSs 326, 328.

Formed within print head 204 and print nozzle 206 is material conduit 308, culminating in nozzle orifice 310. Material 312 is shown partially inserted into material conduit 308. The diameter of orifice 310 may be sub millimeter, e.g., 0.4 mm. The diameter of material 312 and material conduit 308 may be larger, e.g., 1.75 mm. When heated during operation (not shown), material 312 has a desired consistency in accordance with controlled temperature and flows, perhaps with assistance of a force applied to solid material 312, in and through material conduit 308 in print head 204 and heated nozzle 206, exiting orifice 310 to be deposited as shown in FIG. 2.

Print head 204 is also shown in FIG. 3 with heat energy guides formed therein. In some embodiments, heat energy guides may not be necessary in the THS. In FIG. 3, print head 204 has one or more vias 314, 316. In this exemplary embodiment, the THSs are optical fiber 318, 320 coupled laser diodes 326, 328. The optical fibers 318, 320 are inserted into vias 314, 316. Vias 314, 316 and optical fibers 318, 320 may be original manufacture or added after manufacture to a 3D printer. Optical fibers 318, 320 are coupled to laser diodes 326, 328, which each provide a source of energy. One or more THSs may be used and the energy source for each may be common. For example, a single laser diode may be multiplexed across multiple optical fibers. Optical fibers 318, 320 guide or convey energy provided by laser diodes 326, 328 to outputs, exit points, destinations, or terminations 322, 324. Characteristics or properties of guides may vary among embodiments, such as diameter, angle, openings, of holes and/or optical fibers provide paths or trajectories, which may contribute to aiming heat to targeted areas. Terminations 322, 324 of optical fibers 318, 320 may be inset, outset or level with the surface of print head 204. Energy sourced by laser diodes 326, 328, exits terminations 322, 324 and projects or radiates heat energy 330, 332 onto material (not shown in FIG. 3A).

Figure 3B:
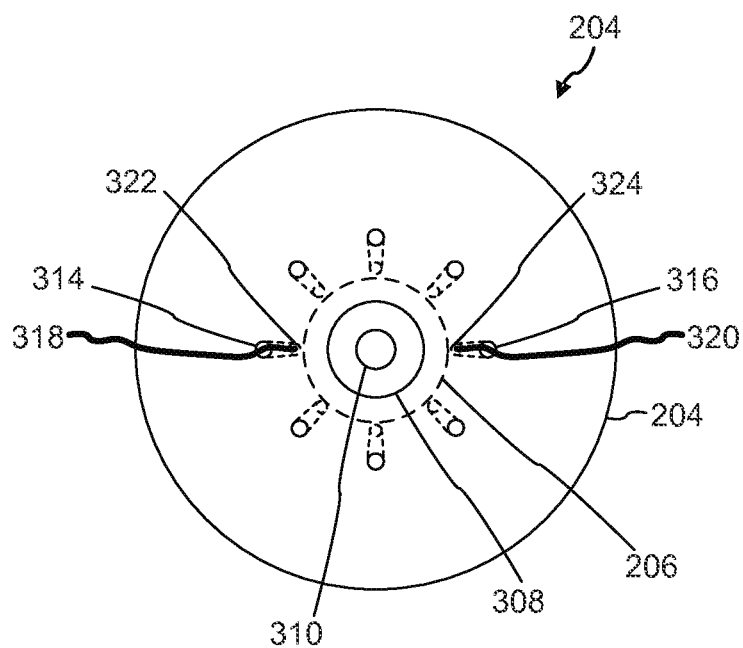
FIG. 3B shows a top view of a print system with targeted heating elements, according to an exemplary embodiment.

FIG. 3B shows a top down view of an exemplary embodiment of a print system with targeted heating elements. FIG. 3B shows an example of print head 204 with eight holes or vias and eight optical fibers with 45 degree angle spacing around orifice 310. Embodiments have an unlimited variety of implementations with fixed and/or mobile (relocatable or repositionable), amiable, focusable, etc. targeted heat elements to provide full coverage of targeted pre and/or post heating for printing operations.

THSs or terminations 322, 324 may be positioned in proximity to nozzle 206. In some embodiments, locating THSs or terminations 322, 324 as close to the nozzle as possible may support accurate pre- and/or post-heating of existing and/or newly deposited material. In some embodiments, heating of the deposition head itself (e.g., print head 204 and/or print nozzle 206) or heating of material 312 being extruded may not be desirable as it may interfere with correct initial deposition of material. In these embodiments heat from THSs that is incident on the deposition nozzle may be minimized. In some embodiments, heating of the deposition head itself (e.g., print head 204 and/or print nozzle 206) or heating of material 312 being extruded may be desirable, e.g., to optimize printing operations or object properties.

Vias 314, 316 in print head 204 may serve to position and aim optical fibers 318, 320 to achieve a desired characteristic, such as optical beam spreads (spot sizes) for various energy intensities (magnitudes) generated by laser diodes 326, 328. In some embodiments, optical fibers 318, 320 or other heat energy conduit (e.g., heat sources or elements) may be exterior to print head 204 and/or print nozzle 204. For example, tubes, clamps or other guides may be used to hold and aim optical fibers rather than holes, such as for a thin tube with a small hole. For example, small diameter precision brass electrode tubes may be attached exterior to print head 204 or print nozzle 206. As an example, a brass print head 204 may be 12 mm tall, holes may be 0.25 mm and an outer diameter of the cladding of bare optical fiber may be 0.12 to 0.14 mm. There may be aiming error when a hole diameter is substantially larger than optical fiber diameter. However, aiming error may not be significant compared to a heat energy spot size created by energy exiting terminations 322, 324.

Laser diodes 326, 328 are coupled, respectively, to optical fibers 318, 320. Optical fibers 318, 320 may be patch cables coupled via a fiber connector (for example, an SMA connector) to the fiber coupled to the laser. Laser diodes come in a large variety of powers, wavelengths and other properties. However, some laser diodes may require low case temperatures to operate. Given that power losses in optical fiber are generally low, in some embodiments laser diodes 326, 328 may be positioned outside the build chamber of a 3D printer. Such design decisions may reduce costs by maintaining a low laser diode case temperature with little expense.

Optical fibers 318, 320 may be embedded in or fed through holes 314, 316. Optical fibers 318, 320 may be flush with, inside or outside of a bottom surface of print head 204 at terminations 322, 324. In this example, the distance of the end of optical fibers 318, 320 to existing material is a height of the nozzle (e.g., ~2 mm) plus the layer height of deposited material (e.g., 0.05 to 0.3 mm) Given that laser spot size increases with distance due to divergence of the light, distance may affect spot size (or spread) of heat impacting existing material and thus the energy density.

For example, a 0.24 numerical aperture laser with a 0.1 mm fiber core diameter, at a distance of approximately 2.05 to 2.3 mm, provides an approximately 1 mm diameter spot size on existing material. Distance may vary widely depending on energy beam collimation and pre- and/or post-heating design objectives. Power distribution of laser diodes 326, 328 may not be linear across the theoretical spot. Power distribution of lasers, e.g., multi-mode lasers, may vary based on several factors. A practical spot size may vary based on optical fiber properties, laser properties, power density and distance, among other factors.

Regardless of where an optical fiber is terminated, it may be self-cleaning for some materials. Given that power density increases geometrically with decreasing distance, when material coats the bottom of the nozzle, laser light may burn it away for uninterrupted operation in pre- and/or post-heating material. Recessing optical fiber termination inside holes 314, 316 may protect optical fiber from physical damage during cleaning of print head 204 or print nozzle 206, although brush bristles having diameters smaller than the diameter of holes 314, 316 may protrude into holes 314, 316.

THSs close to or in print nozzle 206 or other printing mechanism may need to withstand high temperatures. Continuing with the FFF example, print nozzle 206 may be heated over 200 deg C. High temperature sheathed optical fiber may commonly withstand temperatures over 300 deg C, and with gold coatings can withstand 700 deg C. However, fiber sheath and buffer material may be low melting temperature plastics unless they are high temperature sheaths and buffers designed to withstand over 300 deg C. In some embodiments, optical fibers may be stripped of sheath and/or buffer material down to glass cladding to permit close proximity to print nozzle 206.

In some embodiments, optical fiber may be used without optics while in other embodiments optics and/or other components may be used in conjunction with optical fiber. Some embodiments may use a single energy source with a single heating element while other embodiments may use a single source with multiple elements, multiple sources with a single element, multiple sources with multiple elements, etc. Some embodiments may use optical splitters, switches, multiplexers, de-multiplexers and/or other components to provide selected energy to selected element(s). Output power of lasers, e.g., laser diodes 326, 328, may decrease with decreasing spot size. Single mode lasers may be used in some embodiments, e.g., high resolution, low spot size applications. In some embodiments, low cost fiber coupled laser diodes may be suitable to provide targeted pre- and/or post-heating.

In some embodiments, print head 204, print nozzle 206, a component mounted thereon (e.g., a ring track driven by a stepper motor), and/or other component may move statically or dynamically (during operation), e.g., linearly, horizontally, vertically, rotationally and/or otherwise, to reposition targeted heat, change spot size, focus, etc. For example, eight heating elements with equal 45 degree spacing in a circle combined with 45 degree movement may provide full 360 degree coverage for a print head/nozzle that can move in any direction. In some embodiments, less movement may permit quicker reaction to changes in print direction. Vertical movement, perhaps combined with intensity or magnitude adjustment, may adapt to different orifices, material deposition widths, depths, etc.

An example of an advantage of targeted pre-heating, e.g., improved interlayer bonding properties in printed objects or models, is described as follows. Repeated test prints of test objects measuring 13 mm deep×25 mm long×0.8 mm wide, one with and one without targeted pre-heating, revealed during repeated test loading (simple end supported, center loading) that targeted pre-heating nearly tripled the strength of the test object. Specifically, a 0.6 W, 915 nm wavelength diode laser produced an approximately 1 mm spot for targeted pre-heating. The test object material is ABS deposited by a 4 mm print nozzle. Strength, revealed by breaking point force, ranged from 4.6 to 7.4 pounds for a test object without targeted pre-heating and 12.7 to 17.2 pounds for a test object with targeted pre-heating.

FIG. 1 shows a block diagram of an exemplary 3D printer 100 in which embodiments of improved inter-layer bonding in 3D printing may be implemented. In the embodiment shown, 3D printer 100 comprises print control system 102, print system 104, heat element control (HEC) system 106 and targeted heat system 108. 3D printer 100 may use any of a wide variety of 3D print technologies, e.g., depositing extruded material, melting or sintering granular material, melting powder material, laminating layered material and polymerizing light sensitive material.

Print control system 102 may execute one or more programs that monitor, store and control operating parameters, conditions and states to accomplish various tasks, such as printing (manufacturing) a particular multi-dimensional model. Information 111 provided or input to print control system 102 may comprise, for example, a digital model of an object to be created or a series of movement and control commands to print the object. Instructions may be implemented, for example, using G-code commands or commands in another programming language. These G-code or other commands are typically generated by software from a 3D digital model of the desired 3D object. Other commands could be used and different sources for a 3D model, such as 3D scanner input.

Print control system 102 is coupled to print system 104 and HEC System 106. Print system 104 may comprise a printer that responds to commands (e.g., included in communications 113) provided by print control system 102. Commands or instructions may cause print system 104 to move one or more print heads 204 in one or more axes during construction of a model. Commands or instructions may provide Cartesian coordinates and/or change (delta) from current positions. Commands or instructions may also cause material to be fed into one or more print heads. In an example, one or more stepper motors may push material through one or more deposition heads in a friction feed. Commands or instructions may also cause the print system 104 to heat material to an appropriate temperature so that it exits the print head 204 with appropriate properties. In an example, a print head 204 may be heated to melt material at a specific temperature using a resistive heater and a temperature sensor, e.g., thermistor. Print system 104 may communicate data to print control system 102, such as, deposition head positioning data, material deposition data, environmental parameters and/or data regarding sensing of various parameters, conditions and states.

HEC system 106 is coupled to print control system 102 and print system 104. HEC system 106 may receive various parameters, conditions, states, commands/instructions in the form of information or signals. The data received by HEC system 106 includes, for example, deposition/print state (e.g., velocity, direction, temperature), material properties and states, sensor inputs, states of targeted heat sources and elements (e.g., positions, energy output), etc. HEC system 106 is configured to use data provided by print control system 102 to print system 104 and information fed back to print control system 102 by print system 104, which may be provided directly 117 to HEC system 106, as well as information from targeted heat system 106. For example, HEC system 106 may utilize such information to determine control parameters for the HEC system 106. For example, in an FFF 3D printer system, HEC system 106 may utilize information about the type of material, print velocity and direction, perhaps among other information, to control THSs and elements in targeted heat system 108.

HEC system 106, in turn, communicates with targeted heat system 108, which may comprise one or more THSs, one or more energy sources and potentially other components. For example, a THS may also comprise mobility, aiming, focusing, patterning, modulating and/or other components responsive to HEC system 106. A targeted heat system that moves wholly or partly independent of 3D printer components may have linear, rotational and/or other actuator components.

Information utilized by HEC system 106 may be static, dynamic or both. Material may be a fixed or default value. For example, print control system 102 may be configured for a particular type of material. Velocity and direction may change dynamically during printing. Information may be provided directly by print control system 102 and/or print system 104. Information may also be intercepted, deduced or indirectly provided, such as in an add-on architecture where a 3D printer does not integrate a targeted heat system. Information may be deduced from sensor signals or input by a user.

Print control system 102 may be aware of parameters in advance, such as timing (when), positioning (where), direction, velocity and rate of application of deposited material. Such parameters may be used by HEC system 106. In an integrated or add-on architecture, G-code commands may be added to print control system 102 control codes to implement control of HEC control system 106 and/or targeted heat system 106. Additional commands may activate heat sources and elements with appropriate parameters when print system 104 is depositing material.

Parameters may also be deduced from other information. In an FFF system, for example, stepper motors controlling movement axes and material extrusion may be read to determine when, in what direction and at what rate material is being or will be deposited. Reading such information may be performed, for example, by reading step and direction inputs to stepper motors. From this information, print direction, velocity and rate of deposition may be determined and used to control targeted heat system 108. Utilization of such indirect information as input to operate a targeted heat system allows a targeted heat system to be added on to an existing 3D printer as an alternative to or in concert with any degree of integrated architecture.

HEC system 106 may utilize information to set an energy level, energy density, energy intensity, magnitude of heat or other parameter provided to or by one or more targeted heat sources and/or one or more targeted heat elements. For example, information related to properties of the material being heated (e.g., type, color), the current state of the material being heated (e.g., temperature), elapsed time since deposition, ambient conditions (e.g., temperature, humidity, atmospheric pressure), distance of heater elements to material, etc., may be used to determine and control heat energy delivered to a targeted area to achieve desired results, such as improved interlayer bonding. Using the information, HEC system 106 controls heat provided by targeted heat system 108 to heat previously deposited (existing) material and/or additional material to improve the properties of an object (model).

HEC system 106 may provide targeted heat positioning control, for example, when a heat source and/or heat element moves independent of a deposition (print) head. In planar deposition (e.g., X-Y axes) where material is deposited layer by layer stacked in a Z axis, a THS may heat material in advance of or following deposition in any direction in the X-Y plane to provide full coverage. Many configurations, from simple to complex, are feasible in a wide variety of embodiments. As an example, a THS may move in unison with a directional print head that rotates based on a printing direction. In other words, in some embodiments one or more THSs may be fixed relative to a print head while print head movement takes care of alignment for targeted pre- and/or post heating. As another example, a plurality of THSs and a print head may be fixed, where full coverage may be provided by cumulative areas targeted by the plurality of THSs. In other embodiments, heat elements and/or sources may move linearly and/or rotationally. As an example, a print head may be fixed and one or more heat elements may move relative to the print head to provide full coverage. As an example, one heat element may move 360 degrees, two print heads may move 180 degrees, three print heads may move 120 degrees, four print heads may move 90 degrees and so on.

Aside from changing location, in some embodiments, THSs may be controllable to change aim, focus, pattern, area, and/or other heat delivery parameters. In some embodiments this may be accomplished, for example, by steering or otherwise manipulating an energy conduit, modulating a heat source, changing intensity of a heat source and/or manipulating a lens.

As previously mentioned, THS 108 may comprise one or more heat sources, one or more heat elements and potentially other components. A heat source (e.g., a source of energy) may be independent of or integrated with one or more heat elements (e.g., heat delivery). Targeted heat source (THS) may be used interchangeably with targeted heat element and should be interpreted as heat source(s), heat element(s) or both. Examples of THS include, without limitation, a fine stream of hot air, a heated tip of a filament, an electron beam, a laser beam and a fiber coupled laser diode. A THS may be designed and controlled to deliver energy sufficient to raise the temperature of a target area by a desired amount without overheating and substantially confined to a targeted area without substantially heating a non-targeted area. Excessive heating (overheating) or heat spilling (overflow) into non-targeted area may be harmless or harmful, e.g., by wasting energy and/or causing model deformation or weakening.

In other embodiments, printing and targeted heat systems may be distributed differently in more, fewer or different functional blocks.

III. Exemplary Method

Figure 4:
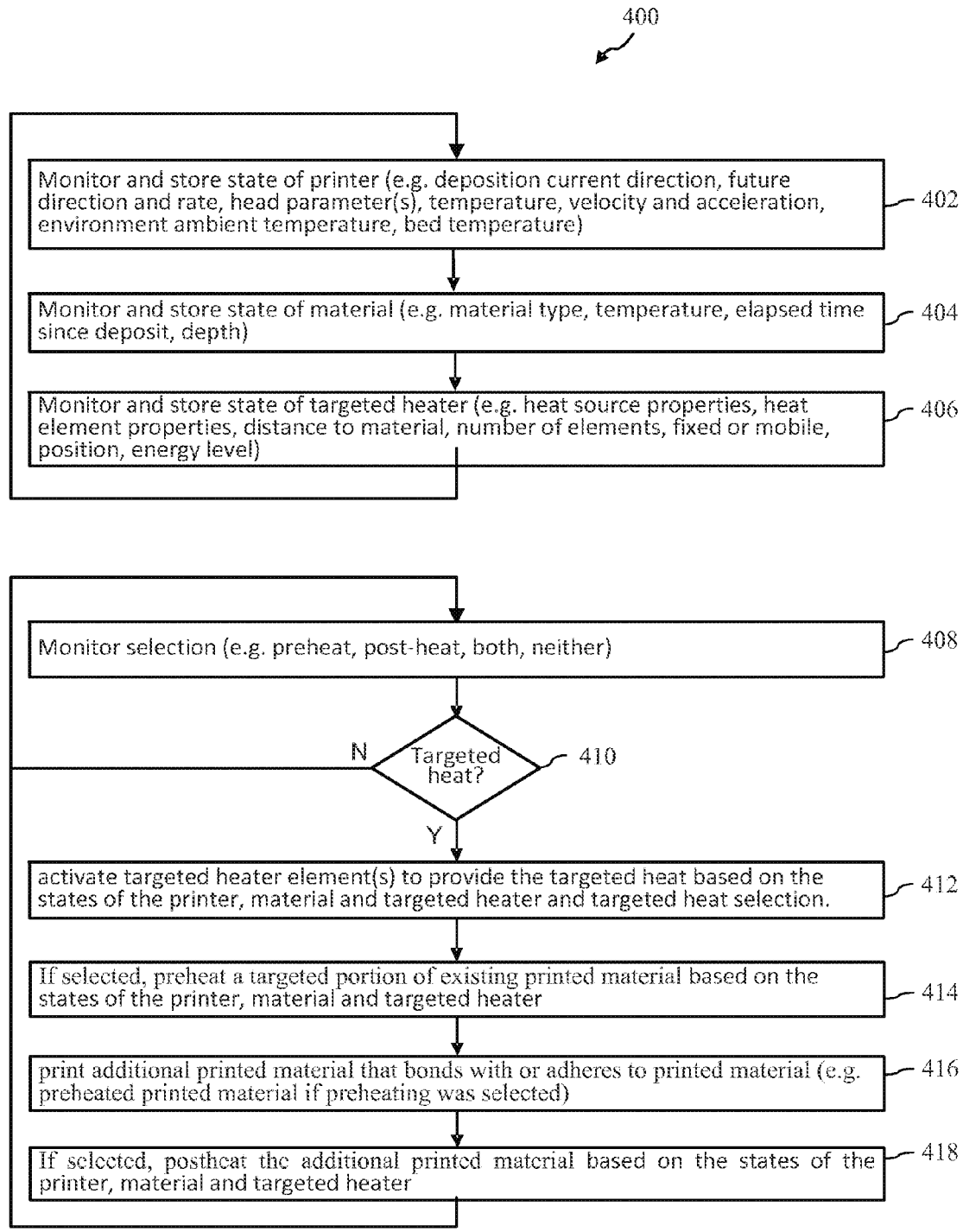
FIG. 4 shows a flowchart of a method of improved inter-layer bonding in 3D printing, according to an exemplary embodiment.

Embodiments may also be implemented in processes or methods. For example, FIG. 4 shows a flowchart of an exemplary method of improved inter-layer bonding in 3D printing. Systems, devices, components, etc. shown in FIGS. 1-3B and other embodiments may operate in accordance with method 400 and/or other methods. Method 400 comprises steps 402 to 418. However, other embodiments may operate according to other methods. Other structural and operational embodiments will be apparent to persons skilled in the relevant art(s) based on the foregoing discussion of embodiments. No order of steps is required unless expressly indicated. There is no requirement that a method embodiment implement all of the steps illustrated in FIG. 4. FIG. 4 is simply one of many possible embodiments. Embodiments may implement fewer, more or different steps.

Method 400 begins with step 402. In step 402, a state of a printer may be monitored and stored. For example, a state of a printer may include, without limitation, deposition current direction, future direction and rate, head parameter(s), temperature, velocity and acceleration, environment ambient temperature, and target bed temperature. A state of a printer may be monitored continuously, periodically or conditionally, e.g., in response to an instruction to provide targeted pre- and/or post-heating of material. For example, as shown in FIG. 1, print control system 102 and/or HEC system 106 may monitor and store a state of a printer.

At step 404, a state of material may be monitored and stored. For example, a state of material may include, without limitation, material type, color, temperature, elapsed time since deposit or time of deposit, and depth. A state of material may be monitored continuously, periodically or conditionally, e.g., in response to an instruction to provide targeted pre- and/or post-heating of material. For example, as shown in FIG. 1, print control system 102 and/or HEC system 106 may monitor and store a state of material.

At step 406, a state of a targeted heat source is monitored and stored. For example, a state of a THS heat source properties, distance to material, number of elements, fixed or mobile, position, energy level. A state of a THS may be monitored continuously, periodically or conditionally, e.g., in response to an instruction to provide targeted pre- and/or post-heating of material. For example, as shown in FIG. 1, print control system 102 and/or HEC system 106 may monitor and store a state of a THS.

At step 408, a selection or command to provide pre-heating, post-heating or both is monitored. For example, as shown in FIG. 1, print control system 102 and/or HEC system 106 may monitor and store a selection or command to provide pre-heat, post-heat or both for some or all material in an object.

At step 410, a determination is made as to whether there is a selection or command to provide pre-heat, post-heat or both for some or all material in an object. Determination 410 may occur at any time before or during printing of an object. Determination 410 may be continuous or periodic, e.g., layer by layer, time increments. If there is no selection or command to provide targeted heat then method 400 loops back to monitoring targeted heat selections. If there is a selection of targeted heat, method 400 proceeds to step 412. For example, as shown in FIG. 1, print control system 102 and/or HEC system 106 may provide determination 410.

At step 412, one or more THS elements are activated to provide the targeted heat based at least on the states of the printer, material and THS and the targeted heat selection, which may provide parameters for targeted heat. For example, as shown in FIG. 1, HEC system 106 may activate THS element(s) in targeted heat system 108 to provide the targeted heat.

At step 414, if selected, a targeted portion of existing material is preheated before the print head deposits additional material. For example, as shown in FIG. 1, HEC system 106 may be configured to cause one or more THSs, e.g., as shown in FIG. 3, to preheat material, e.g., as shown in FIG. 2.

At step 416, additional material is printed that bonds with or adheres to printed material, which may be preheated printed material if pre-heating was selected. For example, as shown in FIG. 2, print head 204 may print additional material 210.

At step 418, if selected, a targeted portion of additional material is post-heated after the print head 204 deposits the additional material. For example, as shown in FIG. 2, THS 220 may post-heat 222 additional material 210 after print head 204 deposits it.

A THS controller may be configured to select one or more heating elements and/or one or more parameters thereof to provide selected pre- and/or post-heating for one or more targeted portions of existing and/or additional material based on one or more parameters, such as current and future directions of printing by a 3D printer.

A THS controller may be configured to select one or more operating parameters, e.g., an energy level, aim, position or movement, for one or more heating elements, based on one or more states, conditions or parameters to provide selected pre and/or post heat of targeted portions of existing and/or additional material.

A method or process may be used to implement a THS that provides pre- and/or post-heating of material that calibrates, optimizes or improves interlayer bonding. A process may monitor, store, update, use and/or control one or more states, conditions or parameters, such as for a 3D printer, material and/or THS. A process may use one or more states, conditions or parameters to activate one or more THS element(s) to provide targeted heat. A process may use one or more states, conditions or parameters to control one or more operating parameters of one or more THS components, e.g., heat source or heat element intensity, aim, position, movement, to provide selected pre- and/or post-heat.

IV. Example Computer System Implementation

Functionality in systems, devices and methods shown in and discussed with respect to FIGS. 1-4 may be implemented in hardware (e.g., hardware logic/electrical circuitry) or hardware combined with one or both of software (e.g., computer program code configured to be executed in one or more processors) and/or firmware.

Figure 5:
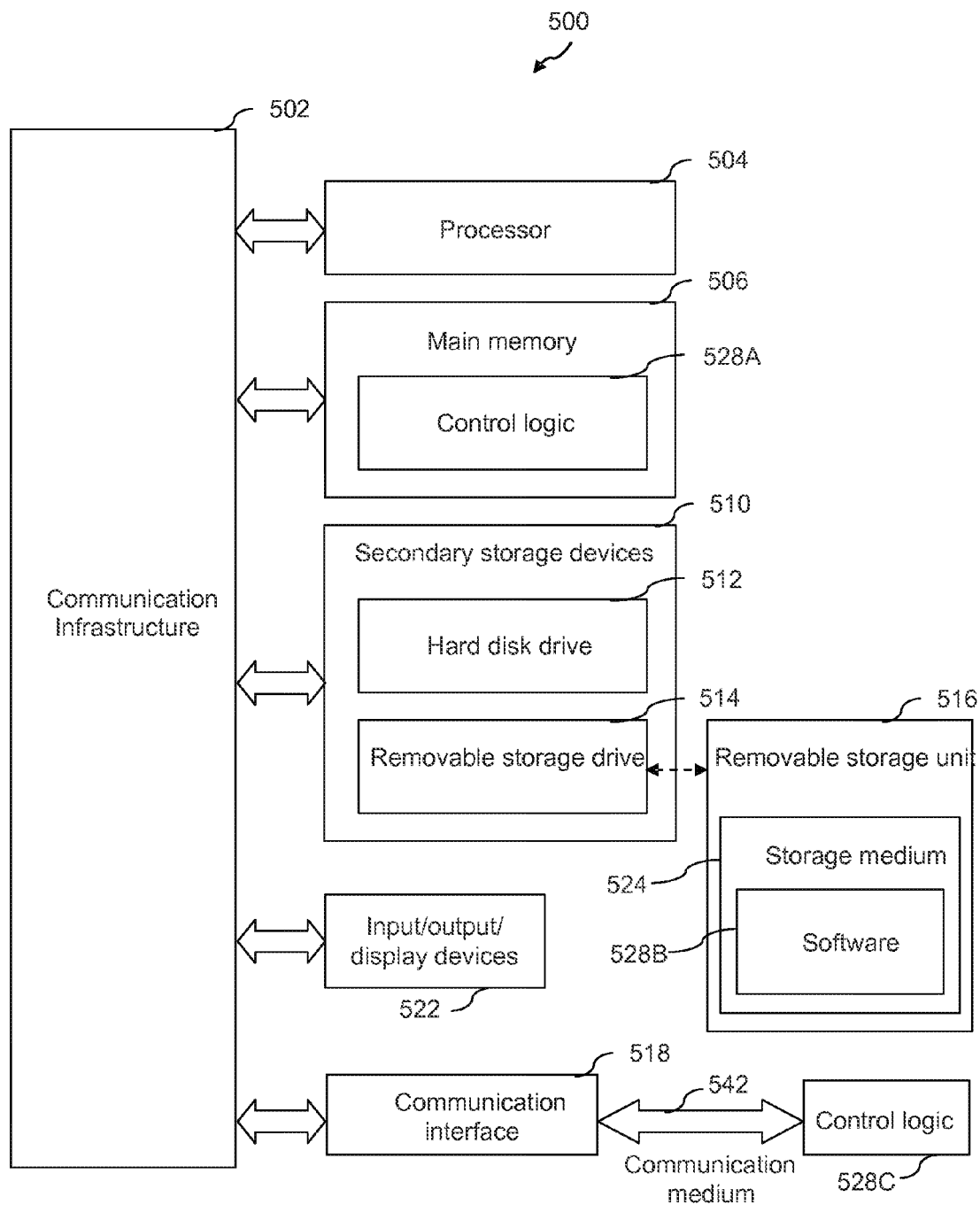
FIG. 5 is a block diagram of a computer system that may be used to implement one or more aspects of the present invention.

FIG. 5 is a block diagram of a computer system that may be used to implement one or more embodiments. Embodiments, such as those described herein, including systems, methods/processes, and/or devices/apparatuses, may be implemented using computers, such as a computer 500 shown in FIG. 5.

Computer 500 can be any available and well known computer capable of performing the functions described herein, such as computers available from International Business Machines, Apple, Sun, HP, Dell, Cray, Texas Instruments etc. Computer 500 may be any type of computer, including a desktop computer, a server, an embedded device, etc.

Computer 500 includes one or more processors or processor circuits (also called central processing units, or CPUs), such as a processor 504. Processor 504 is a hardware device or system that includes one or more hardware elements (e.g., circuits, transistors, memory registers, etc.), and may be configured to execute software and/or firmware. Processor 504 may include one or multiple processor cores (a multiprocessor), and may be implemented in one or more semiconductor material substrates in any manner (e.g., a microprocessor chip, a multi-chip module, a system on chip (SOC), etc.).

Processor 504 is connected to a communication infrastructure 502, such as a communication bus. In some embodiments, processor 504 can simultaneously operate multiple computing threads.

Computer 500 also includes a primary or main memory 506, such as random access memory (RAM). Main memory 506 has stored therein control logic 528A (computer software), and data.

Computer 500 also includes one or more secondary storage devices 510. Secondary storage devices 510 include, for example, a hard disk drive 512 and/or a removable storage device or drive 514, as well as other types of storage devices, such as memory cards and memory sticks or flash devices. For instance, computer 500 may include an industry standard interface, such a universal serial bus (USB) interface for interfacing with devices such as a memory stick or SPI with NAND flash. Removable storage drive 500 represents a floppy disk drive, a magnetic tape drive, a compact disk drive, an optical storage device, tape backup, etc.

Removable storage drive 514 interacts with a removable storage unit 516. Removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. Removable storage drive 514 reads from and/or writes to removable storage unit 516 in a well known manner.

Computer 500 also includes input/output/display devices 522, such as monitors, keyboards, pointing devices, etc.

Computer 500 further includes a communication or network interface 518. Communication interface 518 enables computer 500 to communicate with remote devices. For example, communication interface 518 allows computer 500 to communicate over communication networks or mediums 542 (representing a form of a computer useable or readable medium), such as LANs, WANs, the Internet, etc. Communication interface 518 may interface with remote sites or networks via wired or wireless connections.

Control logic 528C may be transmitted to and from computer 500 via the communication medium 542.

Embodiments of the invention are directed to computer program products comprising such logic (e.g., in the form of program code or software) stored on any computer useable medium. Any apparatus or manufacture comprising a computer useable or readable medium having control logic (software) stored therein is referred to herein as a computer program product or program storage device. This includes, but is not limited to, computer 500, main memory 506, secondary storage devices 510, and removable storage unit 516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of physical computer-readable media. Examples of such hardware-based computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems)

storage, nanotechnology-based storage devices, as well as other physical hardware media such as flash memory cards, digital video discs, RAM devices, ROM devices, and the like. Such computer-readable storage media may store program modules that include computer program logic for implementing the features of each of the devices and servers shown in FIGS. 1 and 2, as well as any of the sub-systems or components contained therein, any of the methods or steps (e.g., functions) of the interaction diagram and flowcharts of FIGS. 3 and 4, and/or further embodiments of the present invention described herein. Embodiments of the invention are directed to computer program products comprising such logic (e.g., in the form of program code or software) stored on any physical hardware computer useable medium. Such program code, when executed in one or more processors, causes a device to operate as described herein.

Embodiments may operate with hardware, as well as with hardware combined with software, firmware, and/or operating system implementations other than those described herein. Any hardware or hardware combined with one or both of software (including operating system) and/or firmware implementations suitable for performing the functions described herein may be used to implement any of many embodiments of the invention.

V. Conclusion

Methods, systems, and apparatuses have been described for improving inter-layer bonding in 3D printing. There are many advantages to implementation of embodiments for improving inter-layer bonding in 3D printing. Properties, e.g. strength, of 3D printed objects with improved interlayer bonding may, for example, be several multiples better than the same object printed without improved interlayer bonding.

Inter-layer bonding in objects manufactured by 3D printing techniques may be improved by one or more THSs that preheat a targeted portion of existing object material before additional material is deposited. Properties of 3D printed objects may also be improved, optimized or calibrated by pre- or post-heating a targeted area of material. One or more targeted heating elements may be attached to, integrated in or independent of a printer in a respective 3D printing technology. THS elements may be fixed, mobile or a combination thereof to apply heat to targeted areas. Targeted heat parameters (e.g., direction, aim, intensity, diameter or pattern of pre-heating) may be controlled. A THS may be integrated in or an add-on to an existing 3D printer. A THS controller may use 3D printer information, such as a current direction or a future direction of printing, to select one or more THS elements and to perform other targeted heat operations, such as setting energy levels, aiming or moving.

Techniques, including methods, described herein may be implemented in hardware (digital and/or analog) or a combination of hardware with software and/or firmware component(s), including computer program products comprising logic stored on any discrete or integrated computer readable medium(s) comprising computer executable instructions that, when executed by one or more processors, provide and/or maintain one or more aspects of functionality described herein.

While the technology has been described in conjunction with various embodiments, it will be understood that the embodiments are not intended to limit the present technology. The scope of the subject matter is not limited to the disclosed embodiment(s). On the contrary, the present technology is intended to cover alternatives, modifications, and equivalents, which may be included within the spirit and scope the various embodiments as defined herein, including by the appended claims. In addition, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the embodiments presented.

References in the specification to "embodiment," "example" or the like indicate that the subject matter described may include a particular feature, structure, characteristic, or step. However, other embodiments do not necessarily include the particular feature, structure, characteristic or step. Moreover, "embodiment," "example" or the like do not necessarily refer to the same embodiment. Further, when a particular feature, structure, characteristic or step is described in connection with an embodiment, it is within the knowledge of one skilled in the art to effect it in embodiments.

Alternative embodiments may use other techniques and/or steps within the spirit and scope of the disclosed technology. The exemplary appended claims encompass embodiments and features described herein, modifications and variations thereto as well as additional embodiments and features that fall within the spirit and scope of the disclosed technologies. Thus, the breadth and scope of the disclosed technologies is not limited by foregoing exemplary embodiments.

What is claimed is:

1. A device for three-dimensional printing of an object, comprising:
    a print head configured to deposit additional print material adjacent to print material previously deposited to form the object;
    a controller configured to identify a targeted portion of the previously deposited print material and to determine a set of heat parameters; and
    a targeted heat source configured to pre-heat the targeted portion of the previously deposited print material using the set of heat parameters prior to the deposition of the additional print material adjacent to the targeted portion.

2. The device of claim 1, wherein the targeted heat source is coupled to the print head.

3. The device of claim 1, wherein the targeted heat source is integrated with the print head.

4. The device of claim 1, wherein the targeted heat source is further configured to pre-heat the targeted portion of the previously deposited print material to a temperature within a predetermined temperature range.

5. The device of claim 1, wherein the controller is further configured to control the operation of the targeted heat source.

6. The device of claim 5, wherein the controller is further configured to aim the targeted heat source at the targeted portion of the previously deposited print material.

7. The device of claim 1, wherein the targeted heat source is an optical fiber coupled laser diode.

8. The device of claim 1, further comprising a second targeted heat source configured to post-heat the additional print material deposited adjacent to the targeted portion using the set of heat parameters.

9. The device of claim 1, wherein the print head uses Fused Filament Fabrication to deposit additional material.

10. A system, comprising:
    a print head configured to deposit additional print material adjacent to print material previously deposited to form the object;

a targeted heat source controller configured to identify a targeted portion of the previously deposited print material and to determine a set of heat parameters; and a targeted heat source configured to pre-heat the targeted portion of the previously deposited print material using the set of heat parameters prior to the deposition of the additional print material adjacent to the targeted portion.

11. The system of claim 10, wherein the targeted heat source is further configured to pre-heat the targeted portion of the previously deposited print material to be within a predetermined temperature range.

12. The system of claim 10, comprising a plurality of targeted heat sources, wherein the targeted heat source controller is configured to select at least one of the plurality of the targeted heat sources to preheat the targeted portion of the previously deposited material based on at least one of a current direction or a future direction of printing by the print head.

13. The system of claim 12, wherein the targeted heat source controller is configured to select an energy level for the at least one heating element based on at least one of a velocity of the print head, an acceleration of the print head, a distance of the at least one heating element to the previously deposited printed material, a type of the previously deposited printed material, a temperature of the previously deposited printed material, a time the previously deposited printed material was printed, an elapsed time since the previously deposited printed material was printed, or a rate of deposition of the additional print material.

14. The device of claim 1, wherein the targeted heat source is a fiber coupled laser without optics.

15. The device of claim 1, wherein the controller is further configured to determine a desired temperature for the targeted portion using material type data.

16. The device of claim 15, wherein the controller is further configured to determine an energy level for the targeted heat source using the desired temperature of the targeted portion, a deposition temperature, and ambient temperature.

17. The device of claim 5, wherein the controller is further configured to control the operation of the targeted heat source based on information deduced from reading step and direction inputs to a motor.

18. The device of claim 7, wherein the targeted heat source comprises a recessed optical fiber termination.

19. The device of claim 16, wherein the energy level is set to raise the previously deposited printed material in the targeted portion to the desired temperature without causing excessive deformation of the surrounding material.

20. The system of claim 10, wherein the targeted heat source is an optical fiber coupled laser diode.

* * * * *